(12) United States Patent
Dilley et al.

(10) Patent No.: US 7,603,439 B2
(45) Date of Patent: *Oct. 13, 2009

(54) SYSTEM FOR TIERED DISTRIBUTION IN A CONTENT DELIVERY NETWORK

(75) Inventors: John A. Dilley, Los Altos, CA (US); Andrew D. Berkheimer, Sommerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/122,776

(22) Filed: May 19, 2008

(65) Prior Publication Data

US 2008/0222281 A1    Sep. 11, 2008

Related U.S. Application Data

(63) Continuation of application No. 11/593,287, filed on Nov. 6, 2006, now Pat. No. 7,376,716, which is a continuation of application No. 10/118,989, filed on Apr. 9, 2002, now Pat. No. 7,133,905.

(51) Int. Cl.
*G06F 15/16* (2006.01)

(52) U.S. Cl. .................. 709/219; 709/203; 709/214; 709/217; 711/122

(58) Field of Classification Search ......... 709/217–219, 709/203, 220, 223–224, 213–214; 711/122
See application file for complete search history.

(56) References Cited

U.S. PATENT DOCUMENTS

| | | | |
|---|---|---|---|
| 5,924,116 A | | 7/1999 | Agarwal et al. |
| 6,108,703 A | * | 8/2000 | Leighton et al. ............ 709/219 |
| 6,112,279 A | | 8/2000 | Wang |
| 6,389,462 B1 | * | 5/2002 | Cohen et al. ................. 709/219 |
| 6,405,252 B1 | * | 6/2002 | Gupta et al. ................ 709/224 |

(Continued)

OTHER PUBLICATIONS

Barish et al, "World Wide Web Caching—Trends and Techniques," IEEE Communications Magazine, May 2000.

(Continued)

*Primary Examiner*—Philip B Tran
(74) *Attorney, Agent, or Firm*—David H. Judson

(57) ABSTRACT

A tiered distribution service is provided in a content delivery network (CDN) having a set of surrogate origin (namely, "edge") servers organized into regions and that provide content delivery on behalf of participating content providers, wherein a given content provider operates an origin server. According to the invention, a cache hierarchy is established in the CDN comprising a given edge server region and either (a) a single parent region, or (b) a subset of the edge server regions. In response to a determination that a given object request cannot be serviced in the given edge region, instead of contacting the origin server, the request is provided to either the single parent region or to a given one of the subset of edge server regions for handling, preferably as a function of metadata associated with the given object request. The given object request is then serviced, if possible, by a given CDN server in either the single parent region or the given subset region. The original request is only forwarded on to the origin server if the request cannot be serviced by an intermediate node.

4 Claims, 5 Drawing Sheets

U.S. PATENT DOCUMENTS

| | | | |
|---|---|---|---|
| 6,484,143 B1 * | 11/2002 | Swildens et al. | 709/223 |
| 6,502,125 B1 * | 12/2002 | Kenner et al. | 709/203 |
| 6,542,964 B1 * | 4/2003 | Scharber | 711/122 |
| 6,553,413 B1 * | 4/2003 | Leighton et al. | 709/219 |
| 6,654,807 B2 * | 11/2003 | Farber et al. | 709/225 |
| 6,754,699 B2 * | 6/2004 | Swildens et al. | 709/217 |
| 6,785,704 B1 * | 8/2004 | McCanne | 709/203 |
| 7,213,071 B2 * | 5/2007 | DeLima et al. | 709/203 |
| 7,376,716 B2 * | 5/2008 | Dilley et al. | 709/219 |

OTHER PUBLICATIONS

Chankhunthod et al, "A Hierarchical Internet Object Cache," 1996 Usenix Technical Conference, Jan. 1996.

Wessels et al, "ICP and the Squib Web Cache," IEEE Journal On Selected Areas In Communications, vol. 16, No. 3, Apr. 1998.

Wessels et al, "Application of Internet Cache Protocol (ICP), version 2," Internet Request for Comment (RFC), Sep. 1997.

* cited by examiner

FIG. 2
(Prior Art)
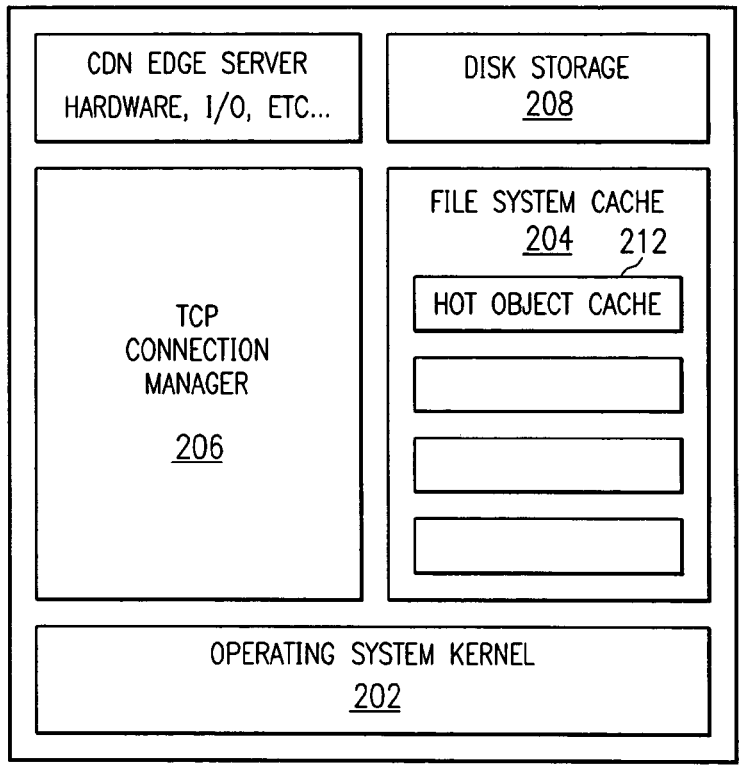
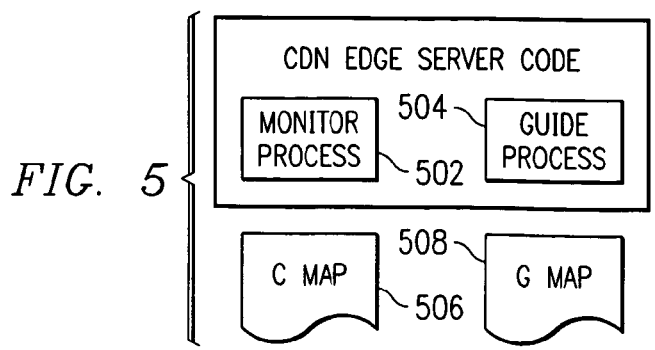
FIG. 5

SYSTEM FOR TIERED DISTRIBUTION IN A CONTENT DELIVERY NETWORK

This application is a continuation of U.S. application Ser. No. 11/593,287, filed Nov. 6, 2006, now U.S. Pat. No. 7,376,716, which application was a continuation of U.S. application Ser. No. 10/118,989, filed Apr. 9, 2002, now U.S. Pat. No. 7,133,905.

BACKGROUND OF THE INVENTION

1. Technical Field

The present invention relates generally to techniques for reducing traffic to origin servers for very popular and large, potentially flash-popular objects.

2. Description of the Related Art

It is well-known to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

It is desirable to reduce wide-area network bandwidth and the load on a content provider's origin server as much as possible. To this end, the prior art has proposed a hierarchical proxy cache architecture wherein caches resolve misses through other caches higher in a hierarchy. This architecture is described, for example, in a paper titled "A Hierarchical Internet Object Cache," to Danzig et al., 1996 USENIX Technical Conference, Jan. 22-26, 1996, San Diego, Calif. In this approach, each cache in the hierarchy independently decides whether to fetch a requested reference from the object's home site or from its parent or sibling caches using a resolution protocol. According to the protocol, if the URL identifying the reference contains any of a configurable list of substrings, then the object is fetched directly from the object's home, rather than through the cache hierarchy. This feature is used to force the cache to resolve non-cacheable URLs and local URLs directly from the object's home. If the URL's domain name matches a configurable list of substrings, then the object is resolved through the particular parent bound to that domain. Otherwise, when a cache receives a request for a URL that misses, the cache performs a remote call to all of its siblings and parents, checking if the URL hits any sibling or parent. The cache then retrieves the object from the site with the lowest measured latency.

While the cache hierarchy described in the above-identified publication provides benefits in the form of reduced access latency to the home site, the scheme is overly complex and costly (in terms of network bandwidth) due to the requirement of measuring latency between the cache and all of its siblings and parents upon a cache miss.

BRIEF SUMMARY OF THE INVENTION

It is a primary object of the present invention to provide a technique for delivering Internet traffic using tiered distribution, namely, a cache hierarchy, in which requests for content that cannot be serviced in edge servers are funneled through intermediate nodes.

It is another primary object of the present invention to provide a content delivery method and system that insulates a content provider origin server from excessive traffic when requesting end users are unable to be served from edge servers, e.g., because the requested content is unavailable, is available but stale, or un-cacheable.

It is still another more general object of the invention to enable CDN edge servers operating within a given CDN region to obtain content from one or more intermediate distribution hubs instead of traversing long haul links to fetch such content from content provider origin servers.

Yet another object of the invention is to facilitate control over a tiered distribution of content in a CDN using object-specific metadata.

A still further object of the invention is to provide for a tiered distribution method and system in a content delivery network to ensure that end users can obtain desired content quickly and reliably, while effectively buffering web site infrastructure, thereby ensuring that an origin site is not overwhelmed with requests for popular content or large files.

Another more specific object of the present invention is to enable a cache hierarchy in a content delivery network wherein a given edge server region is associated with either a single parent region or a subset of intermediate regions to buffer the content provider origin server from flash crowds.

These and other objects and technical advantages are provided in a content delivery network (CDN) having a set of surrogate origin (namely, "edge") servers organized into regions and that provide content delivery on behalf of participating content providers, wherein a given content provider operates an origin server. According to the invention, a cache hierarchy is established in the CDN comprising a given edge server region and either (a) a single parent region, or (b) a subset of well-connected "core" parent server regions. In response to a determination that a given object request cannot be serviced in the given edge region, instead of contacting the origin server, the request is provided to either the single parent region or to a given one of the subset of server regions for handling, preferably as a function of metadata associated with the given object request. The given object request is then serviced, if possible, by a given CDN server in either the single parent region or the given parent region. Preferably, the original request is only forwarded on to the origin server if it cannot be serviced by the intermediate node in the hierarchy.

Preferably, the single parent region is located at, adjacent, or near a data center at which the content provider origin server is located. In addition, a given single parent region may be dedicated to a particular CDN content provider. The edge server regions typically are co-located in large hosting data centers in the well-connected "core" of the Internet web hosting infrastructure. By funneling (i.e., forwarding) edge requests through this smaller subset of regions (or to the single parent region), the CDNSP can significantly reduce the amount of traffic on origin servers and exploit server-to-server optimizations. The tiered distribution service is intended to reduce traffic to origin servers for very popular content and large, potentially flash-popular objects.

As used herein, metadata is information about the content provider's (CP's) content served by the CDN. Typically, metadata is a set of control options and parameters that determine how an edge server handles a request for an object. Preferably, a given metadata tag is used enable the tiered distribution service or feature and to specify a policy or type of hierarchy parent to be used.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

FIG. 2 illustrates a typical machine configuration for a CDN content edge server;

FIG. 5 is a block diagram of software components that provide the cache hierarchy functionality according to an embodiment of the present invention.

DETAILED DESCRIPTION OF THE PREFERRED EMBODIMENT

Figure 1:
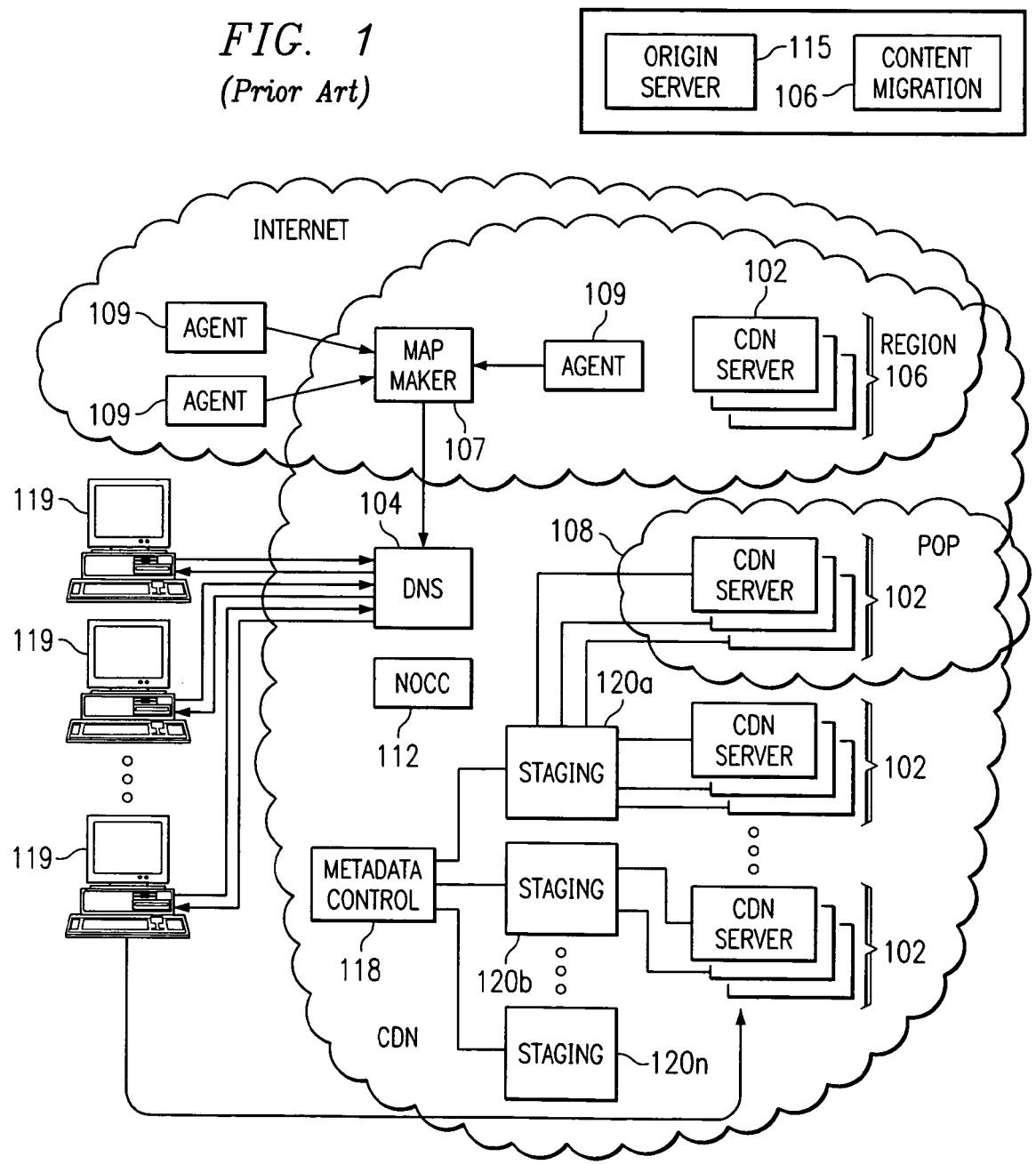
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions.

In one type of service offering, known as Akamai FreeFlow, from Akamai Technologies, Inc. of Cambridge, Mass., content is tagged for delivery from the CDN using a content migrator or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, thus refers to the set of all control options and parameters for the object (e.g., coherence information, origin server identity information, load balancing information, customer code, other control codes, etc.), and such information may be provided to the CDN content servers via a configuration file, in HTTP headers, or in other ways. A configuration file is advantageous as it enables a change in the metadata to apply to an entire domain, to any set of directories, or to any set of file extensions. In one approach, the CDNSP operates a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

FIG. 2 illustrates a typical machine configuration for a CDN content edge server. Typically, the content server 200 is a caching appliance running an operating system kernel 202, a file system cache 204, CDN software 206, TCP connection manager 208, and disk storage 210. CDN software 206 creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss.

Figure 3:
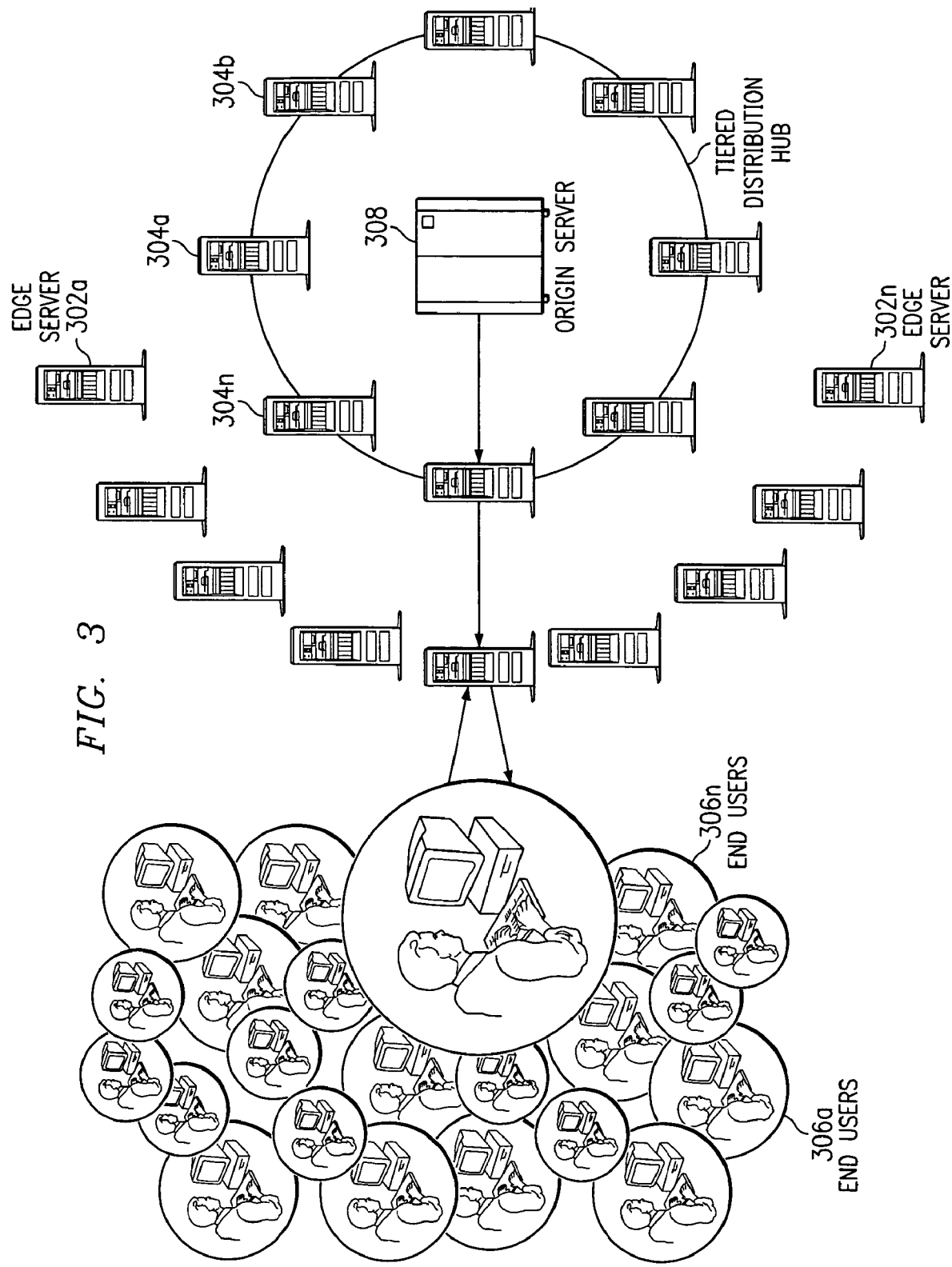
FIG. 3 is a simplified diagram illustrating a tiered distribution scheme according to the present invention.

FIG. 3 illustrates the basic technique for tiered distribution according to the present invention. As the name implies, preferably the CDN (or other distributed delivery system, as the case may be) employs a tiered infrastructure using two or more tiers: a set of edge servers and a hierarchical set of "parent" or hub regions that service the edge servers. In this example, the CDN service provider operates a plurality of CDN edge servers 302a-n and a set of tiered distribution hubs 304a-n. The tiered distribution hubs accelerate content delivery to end users 306a-n and buffer the origin server 308. The tiered distribution hubs ensure that the edge servers have the information requested by the end users. If the edge servers do not have the appropriate file when it is requested, the servers in the tiered distribution hubs will provide the edge servers with the requested content. Preferably, a tiered distribution hub 304 maintains a persistent connection to the origin server 308, although this is not a requirement. The distribution hubs ensure that end users 306 do not flood the origin site with requests if the site is experiencing high traffic load or if the content is stale, large, or infrequently accessed. In effect, the tiered distribution hubs act as accelerators for the end users, ensuring that the users obtain their desired content quickly and reliably, and the hubs acts as buffers for the origin site's internal infrastructure, guaranteeing that the site is not overwhelmed with requests for popular content or large files.

Figure 4:
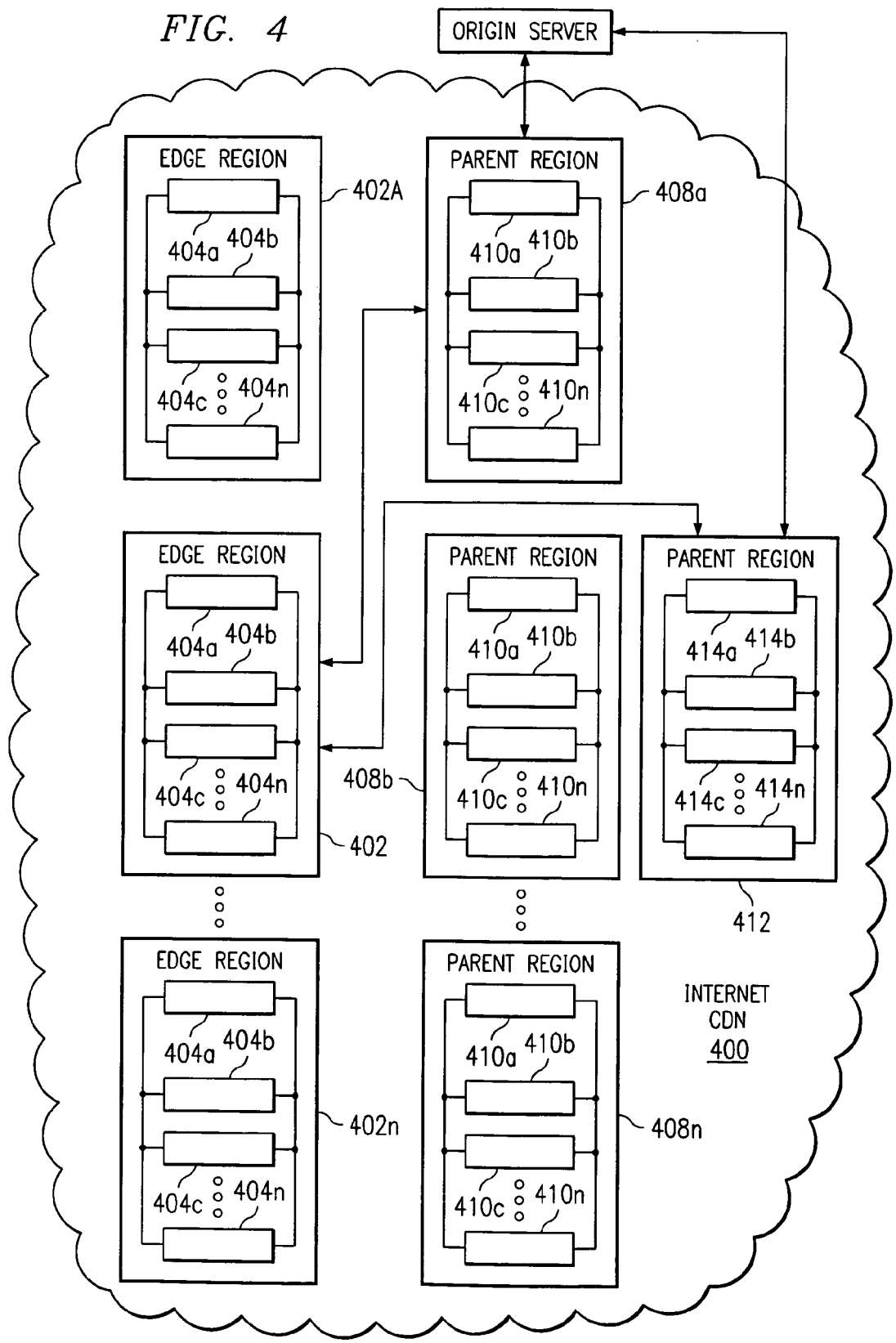
FIG. 4 is a more detailed representation of the tiered distribution scheme wherein a given edge server may communicate with an intermediate core region or a dedicated parent region.

As illustrated in FIG. 4, a given content delivery network 400 may comprise a set of regions 402a-n, each of which comprises a set of content (or "edge") servers 404a-n. CDN customers include a set of content providers (CPs), each of which typically operates a set of one or more origin servers 406. Typically, when a given requested object is not available from a given content server 404, the object may be retrieved from another edge server in the region or, failing that, from the origin server. This known operation is modified according to the present invention. In particular, given content may be marked for distribution from a so-called cache hierarchy that includes a given edge region 402 and either (a) a given subset of the origin server regions (a "multi-region" cache hierarchy) or (b) a dedicated single parent region (a "single-region" cache hierarchy). In the illustrated example, the given subset of parent regions includes regions 408a-n. A given region 408 includes a cluster of "parent" servers, for example, servers 410a-n that, for illustrative purposes only, may be co-located in large hosting data centers in well-connected "core" portions of the Internet web hosting infrastructure. Representative "core" locations include, without limitation, well-connected data centers in the Internet that have high-speed backbones (today these are optical networks running at multiple gigabits per second) and are connected to at least several (e.g., three (3)) other high-speed optical backbone networks. Connection to multiple backbone networks is very desirable to ensure requests can be routed quickly and reliably within the Internet. The number of parent regions in the given subset is variable and their particular location and configuration (e.g., number of servers, connectivity, etc.) is selectable, however, these machines should be relatively powerful and well-connected. An alternative to the multi-region cache hierarchy is a "single region" hierarchy that includes a given edge server region 402 and the single parent region 412 having a cluster of servers 414a-n. Again, the location of the parent region and the number of servers within that region and their connectivity are variable. Typically, however, the single parent region 412 is associated with a particular content provider and, as a preference, it would be located nearby the content provider's origin server or server farm. The single parent region may also be located on the same provider network and geographically close.

By funneling requests that cannot be serviced in edge regions (because the object is not in cache or is in cache but needs to be validated) through either the multi-region or single-region parent clusters, the CDNSP significantly reduces the amount of traffic on content provider origin servers for very popular content and large, potentially flash-sensitive objects. As a result, the cache hierarchy protects the content providers from requests for large, popular objects causing the CDN to make more requests than the content provider can handle. In addition, the cache hierarchy reduces average latency and improves connectivity and content access in what might otherwise be poorly-connected edge regions. Preferably, only a relatively small, specific subset of objects are serviced using the hierarchy, while most objects are fetched using a default mechanism where the edge server contacts the origin server to handle a request that cannot be serviced in the edge region. This selectivity is accomplished preferably using object "metadata."

The following is a representative description of CDN metadata that may be used to create the multiple region or single region parent according to an embodiment of the present invention. Metadata is delivered to the CDN edge servers using a convenient transport mechanism such as illustrated in FIG. 1. Object metadata may be specified by customer, by directory, by object type, or in any other convenient manner. The syntax described is merely representative.

The metadata tag "use-hierarchy" turns on the cache hierarchy feature, specifies the policy or type of hierarchy parent, and lists the base domain to be used.

The default setting for cache hierarchy is OA:

<md name="use-hierarchy">OA</md>

OA indicates that the edge server is to go direct to the (O)rigin-server specified in the (A)RL), where the ARL is a modified URL (or portion thereof) that points an end user browser to attempt to retrieve the object from the CDN. This setting is essentially the equivalent of turning the cache hierarchy off.

To turn on cache hierarchy for a typical CDN customer, the metadata tag may be of the following format:

<md name="use-hierarchy">coremap</md>

Other possible policy settings include, for example, PS or PD followed by an appropriate domain or IP address.

PS (serial) indicates a parent cache with an object's serial number ("a###.") prepended to a specified domain name. The following is a typical setting, for which "coremap" is established as an alias. For example:

<md name="use-hierarchy">PSch.cdnsp.net</md>

This results in the edge server doing a DNS lookup for aX.ch.cdnsp.net, where X is a serial number. The subdomain listed may change depending on the customer.

PD (domain) indicates a parent cache with a specified hostname or IP address. For example:

<md name="use-hierarchy">PDmyparent.cdnsp.com</md>

This results in the edge server doing a DNS lookup for myparent.cdnsp.com as a hierarchy parent.

<md name="use-hierarchy">PD204.178.107.233</md>

This results in the edge server using the listed IP as a hierarchy parent.

To provide a concrete example, assume that a content provider object has been tagged for delivery by the CDN (either explicitly or implicitly) using the tag a9.g.aka.net, where a9 is a serial number useful for load balancing purposes. One such technique is described in U.S. Pat. No. 6,108,703, which is incorporated herein by reference. An end user browser looking for that object is directed to an optimal CDN edge server in a given region using a dynamic DNS request routing mechanism, again as described in the above-identified patent.

Now, assume that the CDN edge server either does not have the object in cache or that the object in cache is stale. If the CDN edge server has received object metadata, software executing in the edge server changes a9.g.aka.net (the original tag) to a9.c.aka.net for the multi-region approach (for resolution against a core map) or, alternatively, to something like a9.48.aka.net for the single region approach (with "r48" being region 48, presumably somewhere near the origin server). Thus, application of metadata determines the name of the server region through which the request is funneled to fetch or validate the object being requested. This is the origin server by default, but it can also be a cache hierarchy parent, as described above. In the example, a9.c.aka.net then gets resolved, e.g., through a first DNS level in the request routing mechanism (such as described in the '703 patent) to identify a best core region (e.g., a core region closest to the edge region) and then perhaps through a second DNS level to identify the best edge server in that region. If the metadata implements the single region parent, the first level returns second level servers specific to region 48. Of course, the use of multi-level DNS is merely illustrative. Generalizing, while the actual format of the edge server request to its parent varies, it may be of the form aSerial.rRegion.cdnsp.net.

Thus, in accordance with an embodiment of the tiered distribution scheme, as edge server region contacts either a core region or a dedicated parent region (edge server region→core region or single backing region) as a function of given object service metadata. With respect to objects that have been identified to be distributed via the cache hierarchy, the origin server preferably is only contacted when a server in a parent region needs to fetch content, or when the server in the parent region needs to revalidate existing content. While the above description shows an edge server contacting an intermediate core region or a parent region, it should also be appreciated that the core region may be backed up by a single region so that the hierarchy is as follows: edge server region→core region→single backing region→origin server.

FIG. 5 illustrates the basic software and data components useful in the cache hierarchy. This software may be implemented as part of the CDN software running in each edge server as illustrated in FIG. 2. The functionality may be implemented on a standalone basis. As noted above, an edge server includes a cache for storing content provider content. The server receives end-user requests for origin server content and serves this content authoritatively if it can do so. A monitor 502 is a software process that monitors and reports edge server performance for load balancing and customer analysis. A guide process 504 preferably is a component of the CDN edge server software (although it may be a standalone process) that directs the edge server to use another CDN server (i.e., an intermediate) instead of the customer's origin server for given content requests that are being managed by the cache hierarchy. A C map 506 is a mapping from a client network address to a nearest CDN region that preferably is used by the CDN's DNS-based request routing mechanism to direct client requests. In an illustrative embodiment, the C map 506 is a map that contains a subset of the regions in a more global G map 508 used by the CDN service provider as part of the request routing mechanism. These subset regions are sometimes referred to herein as "parent" regions.

Figure 6:
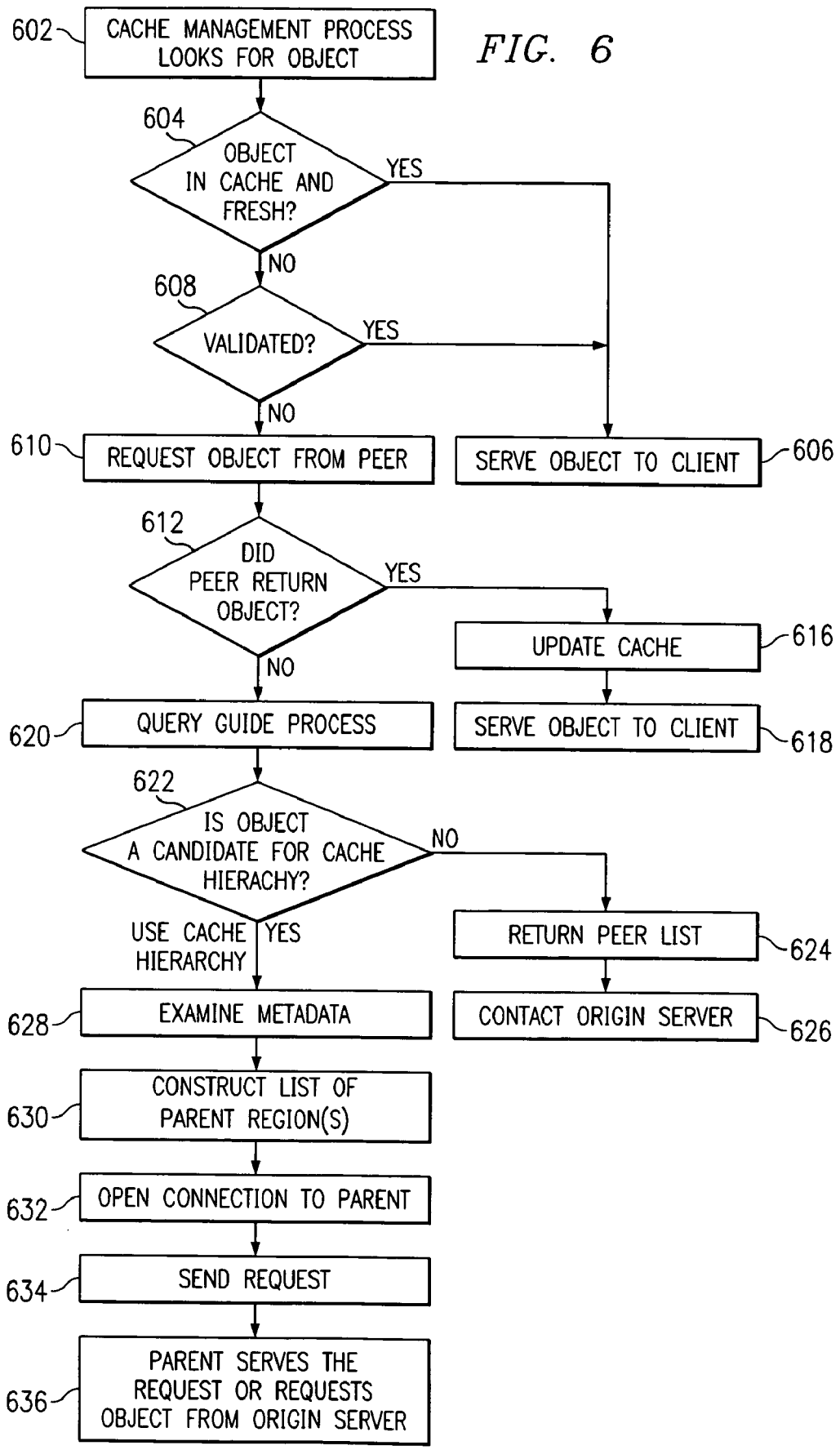
FIG. 6 is a flowchart illustrating how a content server implements the cache hierarchy functionality according to the present invention.

FIG. 6 illustrates a flowchart of a preferred operation of the present invention when a given edge server receives a client request for an object. The routine begins at step 602 with the edge server cache management process looking for the object in the content server's cache. If the requested object is in cache and is fresh as indicated by a positive outcome of the test at step 604, the object is served back to the requesting client at step 606; otherwise, the process attempts to validate the object at step 608. If the object is not in cache or needs to be validated, the edge server makes a request (e.g., via a cache sharing protocol) to other edge servers in the region (each a "peer") to see if one of them has a fresh copy of the object. This is step 610. If the peer then returns a valid object, the edge server continues at step 616 to update its cache and, at step 618, to return the object to the requesting client. This completes the processing. If, however, the outcome of the test at step 612 indicates that a peer has not returned a hit, i.e., no peer copy of the object is available, the process continues.

At step 620, the edge server queries its associated guide process to identify where to go to get the object. At step 622, the guide process makes a determination whether the object is a candidate for using the hierarchy. As noted above, preferably this determination is made by having the guide process examine object metadata for a given tag, e.g., "use-hierarchy," in a data string. An illustrative data string is a resource locator that has been modified to point to the CDN. Preferably, only objects with a "use-hierarchy" tag in the CDN resource locator are candidates for using the cache hierarchy; candidates that use features inconsistent with the scheme (see below) preferably are not served through the cache hierarchy. If the object is not a candidate for distribution through the hierarchy, the guide process at step 624 returns a peer list that includes just a given directive (e.g., DIRECT), which causes the server, at step 626 to talk to the origin server to obtain the object as usual. If, however, the object is a candidate for tiered distribution, the guide process examines the "use-hierarchy" metadata information at step 628 and, at step 630, the process constructs a list of one or more parent region(s) or a dedicated parent region. At step 632, the server opens a connection (or uses a persistent one) to a parent region on the list and, at step 634, it sends the request to a server in the parent region. The requesting server preferably adds a request header to the request, which serves to nominate the receiving server (in the parent region) as a hierarchy parent.

In the alternative, the edge server generates a DNS query to the CDN request routing mechanism to identify a best core region and best server within that core region per the dual-level DNS scheme described above.

At step 636, the parent serves the request either from its cache if it has it, or by making a request to the origin server. Preferably, a parent will not make a request to another server in the hierarchy; rather, its guide process by default will return only to the origin server as a valid destination. This completes the process.

Preferably, the edge server includes an application programming interface (API) for the guide process to facilitate location of a parent region (from which the object can be fetched). Data may be feed to the guide API by the content serving process, or from other external sources. This data may include, but is not limited to, information from the request received by the content server, and information from object metadata that applies to the requested object. The guide API preferably includes routines that allow the content server to initialize the guide, to shutdown the guide, and to lookup a list of servers that should be contacted to request an object given the data provided to the guide. Each entry in the list of servers preferably includes a DNS name or IP address for each server, and an indication of whether that server is an origin server or a parent server.

As noted above, a defined, specific subset of objects may be serviced using the hierarchy while other objects are fetched using a default mechanism (which could be thought of as a degenerate hierarchy with one root, namely, the content provider origin server). Use of the hierarchy preferably is determined via a metadata component that overrides an edge server default hierarchy mechanism. Preferably, this metadata component is controlled by the CDN service provider. To service the needs of multiple content providers, this metadata preferably is settable on a per-object basis from the outset, but it may be desirable also to enable all of a customer's files to use a non-default.

When a particular edge server communicates with another server in the hierarchy, the edge server preferably acts as a proxy. This may necessitate some changes to the HTTP headers in the client request (to indicate that the client is an edge server) and in the server response (so that the edge server receives all of the information it needs to correctly serve the object). In creating its response to a child (an edge server requesting the content from another server in the hierarchy), the parent preferably passes along any information so that the child can correctly construct the metadata and current coherence state of the object. In an illustrative embodiment, the parent should send the headers it received for object unchanged, possibly with a few exceptions, so that the child sees the object the same way that the serving parent saw it. Some exceptions are that the response should also include an Age header to reflect how long that the object has been in the CDN (replacing the Age header received from an upstream proxy if necessary), and a Date header updated to the current time.

Thus, according to a preferred embodiment, given content is associated with the cache hierarchy functionality using metadata. This functionality thus can be applied to specific paths and extensions. Preferably, the alternate resource locator for the content is unmodified (from what it would be normally in the CDN). Moreover, preferably only edge-of-network content servers (running CDN software) get such content from the parent regions (if they do not already have it), and parent regions get the content (if needed) from the origin server(s). Preferably, servers in parent regions are not dedicated; rather, they run CDN software and may act as edge servers for some requests. Typically, a machine that serves as a parent machine is well-provisioned with good connectivity and a large amount of disk storage. A parent typically sends a child (an edge server running the CDN software) with information about how long (time-to-live or TTL) the content may stay in the child cache and still be deemed fresh.

The present invention provides numerous advantages. Cache hierarchy uses a hierarchy of servers to distribute content closer to the requesting end users. This functionality is particularly advantageous for flash-popular content or for very large content because it allows the CDN edge servers to go to a selected set of machines for the content (as opposed to the origin server). As a consequence, the origin server will be expected to have to fulfill much fewer requests.

Representative content servers running CDN software according to the present invention are Intel Pentium-based computers running a Linux or Linux-variant operating system. One or more of the processes described above are implemented as computer programs, namely, as a set of computer instructions, for performing the functionality described.

Having described our invention, what we claim is as follows.

The invention claimed is:

1. A server operating in a content delivery network (CDN) having an authoritative domain name service (DNS) and a set of servers organized into regions that provide content delivery on behalf of participating content providers, wherein the CDN also includes a set of CDN cache hierarchy nodes, comprising:

a processor;

an operating system;

a cache;

memory in which content provider-specific metadata is stored, the content provider-specific metadata describing content handling requirements for given content provider content;

code executable by the processor for determining whether a given object request can be serviced from the cache, the given object request associated with a first data string that has been resolved by the authoritative DNS to identify the server;

code executable by the processor and responsive to a determination that the given object request cannot be serviced from the cache for evaluating content provider-specific metadata to determine whether the given object request is to be serviced by a CDN cache hierarchy node;

code executable by the processor and responsive to a determination that the given object request is to be serviced by a CDN cache hierarchy node for directing a new request for the given object to a CDN cache hierarchy node intermediate the server and a source server identified in the content provider-specific metadata, where the new request is directed over a new connection to the CDN cache hierarchy node that the server opens, or over a persistent connection between the server and the CDN cache hierarchy node; and code executable by the processor to receive a response from the given CDN cache hierarchy node, where the response includes a content object associated with the given object request and time-to-live (TTL) information for the content object.

2. The server as described in claim 1 wherein the CDN cache hierarchy node intermediate the server and the source server is identified by the authoritative DNS.

3. The server as described in claim 1 further including code executable by the processor to rewrite a request header associated with the given object request prior to directing the new request to the given CDN cache hierarchy node.

4. The server as described in claim 1 wherein the content provider-specific metadata being settable on a per-object basis.

* * * * *